July 30, 1968     M. SHOELD     3,395,043
STORAGE BATTERY HAVING SPIRAL ELECTRODES OF THE PASTED TYPE
Filed May 9, 1967
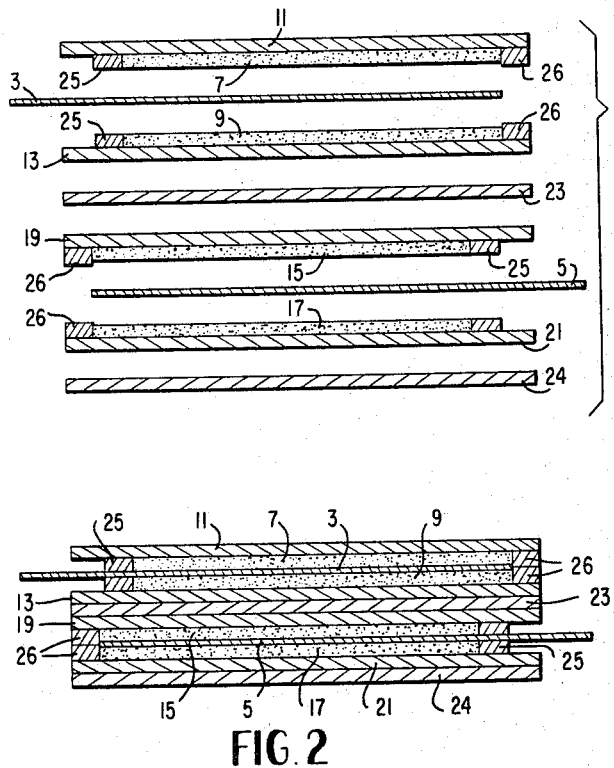
FIG. 1
FIG. 2
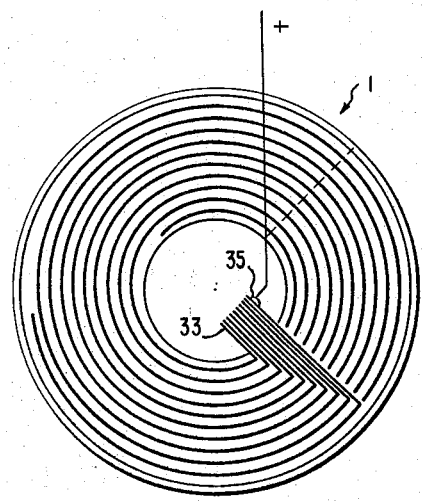
FIG. 4
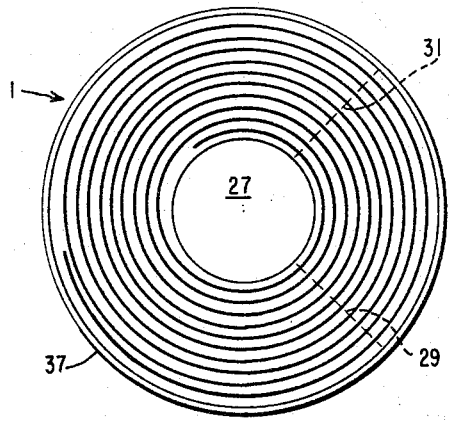
FIG. 3
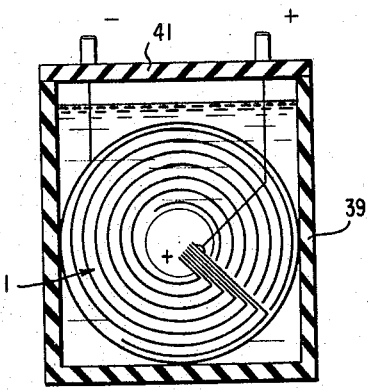
FIG. 5
INVENTOR
MARK SHOELD
BY Young & Thompson
ATTORNEYS United States Patent Office 3,395,043
Patented July 30, 1968

3,395,043
STORAGE BATTERY HAVING SPIRAL ELECTRODES OF THE PASTED TYPE
Mark Shoeld, 2140 E. Graves, Ave.,
Orange City, Fla. 32763
Filed May 9, 1967, Ser. No. 637,219
3 Claims. (Cl. 136—13)

ABSTRACT OF THE DISCLOSURE

A lead acid storage battery of the jelly-roll type, in which the sandwich that is rolled up comprises a plurality of superposed layers including two lead foils which are the electrodes. Layers of lead peroxide paste, supported on high wet strength kraft paper, are disposed on and in contact with opposite sides of the positive foil; while layers of colloidal lead paste, similarly supported, are disposed on and in contact with opposite sides of the negative foil. There is also at least one sheet paper spacer between the positive and negative assemblies.

---

The present invention relates to storage batteries having spiral electrodes of the loose paste type. It will be described and illustrated in connection with a lead acid battery, as shown in the accompanying drawing, in which:

FIG. 1 is a diagrammatic view of the sandwich of superposed layers of the battery of the present invention, with the layers spaced apart and greatly magnified in thickness for clarity of illustration;

FIG. 2 is a view similar to FIG. 1, but showing the layers in enlarged cross section and in assembled condition;

FIG. 3 is a somewhat diagrammatic end view of a storage battery unit of the present invention, at one stage of construction;

FIG. 4 is a view similar to FIG. 3, but showing the completed storage battery unit; and FIG. 5 is a side elevational view, partly in section, showing a completed storage battery assembled according to the present invention.

Referring now to the drawing in greater detail, there is shown a storage battery unit indicated generally at 1, and comprising a stack or sandwich of superposed layers that are rolled up in a spiral. This is sometimes known in this art as "jelly roll" construction. The sandwich comprises a pair of lead foils 3 and 5, one of which is the positive plate and the other of which is the negative plate. On opposite sides of positive foil 3 are disposed layers 7 and 9 of lead peroxide paste (PbO$_2$). The layers 7 and 9 are supported on sheets 11 and 13 of high wet strength paper which may for example be kraft paper.

On opposite sides of the negative foil 5 are disposed layers 15 and 17 of colloidal or spongy lead paste. This material is the conventional spongy lead paste ordinarily used in batteries of the lead-acid type. The layers 15 and 17 are supported on their sides opposite foil 5 by sheets 19 and 21 of high wet strength paper such as kraft paper. Additional sheets 23 and 24 of high wet strength paper are disposed between the sheets 13 and 19, and on the side of sheet 21 opposite layer 17, respectively.

Preferably, the lead in foils 3 and 5 is about equal in weight to the lead as such in peroxide layers 7 and 9, and also to the colloidal lead in layers 15 and 17.

It is particularly to be noted that the foil 3 extends at one side edgewise beyond the associated sheets 11 and 13, while the adjacent edges of the sheets 11 and 13 in turn extend edgewise beyond their associated layers 7 and 9 of lead peroxide paste. Similarly, the foil 5 extends edgewise beyond the adjacent sheets 19 and 21, but in the direction opposite the foil 3, while the sheets 19 and 21 in turn extend edgewise beyond the associated layers 15 and 17 of colloidal lead paste. In this way, structure for the formation of electrical connections of opposite polarity at opposite ends of the completed unit is provided, and also the active materials are effectively insulated from each other.

Paper strips 25 and 26 applied in strip form close the ends of the layers 7, 9, 15 and 17 of active material, to prevent escape of the active material edgewise. Strips 25 and 26 are of course porous.

Strips 25 are of a thickness equal to the thickness of the layers of active material 7, 9, 15 and 17 and the strips 26 are of a thickness equal to that of the active layers plus one-half the thickness of the metal foil as indicated in the drawings. If desired, the strips 25 may be secured to the paper strips carrying the active material by adhesive. Similarly, if desired, each pair of strips 25 may be adhesively secured to each other to form a plug as shown.

The sandwich described above is rolled up in spiral fashion on a central core or mandrel 27 of hard rubber or other plastic. The mandrel 27, however, is of a length only equal to the length of the sheets 11, 13, 19, 21, 23 and 25, so that the endwise extending edges of the foils 3 and 5 project beyond mandrel 27 in their respective directions. To form the terminals or electrical connections to the unit, these axially overhanging spiral edges of the foils are sliced along the dotted line 29 in FIG. 3, to a depth equal to the axial extent of the overhang. In other words, a radial cut is made through the plural spaced layers of overhanging end of the foil, to a depth down to the end of the mandrel. Then, beginning from a radially inner periphery of the spiral, this cut is extended from its bottom peripherally about at least a portion of the periphery of the mandrel, approximately in the plane of the mandrel end, to the dotted line 31 shown in FIG. 3, so that the end strips are cut from the multiple layers of the foil. These strips 33, however, remain attached to their respective foil layers.

The strips 33 are then bent radially inwardly as shown in FIG. 4 and are secured together as by soldering or clamping or twisting, thereby to form a junction or terminal 35 of the battery unit. The same operation is repeated at the opposite end of the unit to form the terminal of opposite polarity (not shown).

The mandrel may be of any suitable diameter and is preferably maintained in the roll after completion. If desired, the space within the mandrel may be filled with a suitable foam or other filler.

The completed unit may if desired be encased in a polyethylene or other plastic sleeve 37 or other suitable constricting and confining container.

A plurality of individual units 1 will ordinarily be disposed in series and will of course be wet with a sulfuric acid electrolyte. To this end, as shown in FIG. 5, the units can be encased with their axes horizontal, so as to protect their end or terminal structure, in a casing 39 of hard rubber or plastic or the like having a cover 41. The casing 39 and cover 41 can be of generally conventional construction, and the cover 41 is of course provided with the usual vents (not shown).

To enable those skilled in this art to practice the invention, the following illustrative example is given:

EXAMPLE

Two lead foils are used, each 50 feet long and 12½ inches wide and 0.002 inch thick. Six 50-foot strips of kraft paper of conventional nature, of 0.008 inch thickness each, having a porosity approximately 60% and weighing ¼ ounce/sq. ft. dry, are used. This paper is acid proof and of high wet strength, because rubber latex is used in its manufacture.

On two of the paper strips, on one side only of each, there is coated lead peroxide in the form of a paste containing 30% by weight of water, balance lead peroxide, to a thickness of about 0.006 inch. On two of the other strips, a coating of about the same water content is deposited, but of a paste of colloidal lead of conventional nature. The pastes are coated on their respective backings, however, so as to leave about ½ inch of uncoated paper along one edge of each strip.

The sandwich is then assembled as shown in FIGS. 1 and 2 and is wrapped up on a hard rubber mandrel 12 inches long and 3 inches in diameter. The finished diameter is about 10 inches. The end connections are then formed as shown in FIGS. 3 and 4 and the end strips 33 clamped together so that they are in electrical contact with each other. The completed unit is then wrapped in two or three layers of polyethylene sheet and wide rubber bands are slipped over the polyethylene.

To add the electrolyte, a plurality of the rolls are disposed with their axes horizontal in a lead-lined vacuum tank. A nearly complete vacuum is then produced, and sulfuric acid of 53° Baumé is introduced. The pore spaces of the kraft paper are thus filled; and with the water in the paste, an acid electrolyte of 1.28 specific gravity is achieved, which is desirable for the fully charged battery. On discharge, the acid strength goes down to about 1.20 specific gravity.

Alternatively, the rolls can be disposed as described above, in a lead-lined tank with open top and at atmospheric pressure. Sulfuric acid of 1.28 specific gravity is then introduced slowly at the bottom, and the water in the units is gradually displaced and runs off over the top of the tank in the form of weaker acid. A series of two or three of these tanks can be used so as in effect to produce a stepwise countercurrent operation. The dilute acid is recovered by the addition of oleum or even fuming acid to bring it up to the desired original specific gravity of 1.28.

Including the electrolyte and a proportional part of the casing and cover 39, 41, the per unit weight is about 52 pounds, of which about 36 pounds is lead, divided in three parts: 12 pounds, the total weight of the two lead foils, the lead in the lead peroxide and the lead of the colloidal lead would have a combined weight of 24 pounds.

The unit produces a voltage of about 2.2. Due to the high ratio of active mass to electrode the energy density is greatly in excess of the normal 10 watt-hours per pound for ordinary lead-acid batteries being as high as 50–60 per pound. The reaction on discharge is as follows:

$$PbO_2 + Pb + 2H_2SO_4 \rightarrow 2PbSO_4 + 2H_2O$$

And of course in charging, the reaction goes in the opposite direction.

Although the present invention has been described and illustrated in connection with a preferred embodiment, it is of course to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. A lead-acid storage battery comprising a plurality of superposed layers including a pair of lead foils, a first layer of active material consisting essentially of lead dioxide against one of the foils, a second layer of active material consisting essentially of lead in colloidal form against the other of the foils, a mandrel, said plurality of layers being rolled up in a spiral on said mandrel, at least one layer of insulting paper separating said first and second layers of active material from each other and separating said first layer from said other foil and said second layer from said one foil, said first and second layers of active material being layers of paste supported by flexible porous strips of insulating paper, portions of said strips of insulating paper extending axially beyond the associated paste, and retainer portions of porous insulating paper adjacent the edges of the strips and disposed edgewise beyond said layers of paste and between said layers of insulating paper and retaining the layers of active material in place, one said foil projecting beyond the active material and insulating paper at one end of the spiral, the other said foil projecting beyond the active material and insulating paper at the other end of the spiral, and portions of the projecting ends of the foils being in electrical contact with each other and providing terminals for the battery.

2. A lead-acid storage battery comprising a first strip of lead foil, a strip of porous insulating paper of high wet strength disposed on each surface of said strip of lead foil, a layer of lead dioxide paste on the surface of each strip of insulating paper facing the strip of lead foil and in contact with said lead foil and forming a positive electrode, a second strip of lead foil, a strip of porous insulating paper of high wet strength disposed on each surface of said second strip of lead foil, a layer of a paste of lead in colloidal form on the surface of the last-mentioned strips of insulating paper facing the second strip of lead foil and in contact with said second strip of lead foil and forming a negative electrode, portions of said strips of insulating paper supporting the pastes extending axially beyond the associated paste, and retainer portions of porous insulating paper adjacent the edges of the strips of insulating paper and disposed edgewise beyond said layers of paste and between said strips of insulating paper and retaining the layers of paste in place, said electrodes being rolled up in the form of a spiral, the lead foil of the positive electrode projecting beyond the paste of lead dioxide and insulating paper associated therewith at one end of the spiral, the lead foil of the negative electrode projecting beyond the paste of lead in colloidal form and insulating paper associated therewith at the other end of the spiral, portions of the projecting foil of the positive electrode being in electrical contact with each other and portions of the projecting foil of the negative electrode being in electrical contact with each other and providing terminals for the battery.

3. A battery according to claim 2 wherein a strip of porous insulating paper is interposed between the positive and negative electrodes and rolled up with the electrodes.

References Cited

UNITED STATES PATENTS 2,487,499    11/1949    Webb _____ 136—13
3,083,249    3/1963    Belove _____ 136—13
3,141,795    7/1964    Eisler _____ 136—26

WINSTON A. DOUGLAS, *Primary Examiner.*

A. SKAPARS, *Assistant Examiner.*